United States Patent [19]
Anissimov et al.

[11] Patent Number: 5,958,294
[45] Date of Patent: Sep. 28, 1999

[54] POLYMER COMPOSITION FOR THE PRODUCTION OF FILMS USED IN AGRICULTURE

[75] Inventors: Vasilii M. Anissimov; Nataliia L. Zaychenko; Irina R. Mardaleyshvili; Viktor S. Marevtsev; Mikhail A. Ostrovskii; Andrey I. Shienok, all of Moscow, Russian Federation; Yoon D. Chang, North Potomac, Md.

[73] Assignee: ATRI Systems, Inc., Wilmington, Del.

[21] Appl. No.: 08/966,164

[22] Filed: Nov. 7, 1997

Related U.S. Application Data

[60] Provisional application No. 60/030,812, Nov. 14, 1996.

[51] Int. Cl.$^6$ .............................. C09K 11/08; C08K 3/18
[52] U.S. Cl. ................................ 252/301.33; 25/301.35; 524/129; 524/357; 524/399; 524/430; 428/913
[58] Field of Search .................................. 524/129, 357, 524/399, 430, 301.33, 301.35; 428/690, 913

[56] References Cited

U.S. PATENT DOCUMENTS 5,422,220  6/1995  Leblans et al. ..................... 430/139
5,585,692  12/1996  Sugimoto et al. ............... 252/301.4 R

FOREIGN PATENT DOCUMENTS 2047623  11/1995  Russian Federation .
2047624  11/1995  Russian Federation .

*Primary Examiner*—Tae Yoon
*Attorney, Agent, or Firm*—Blank Rome Comisky & McCauley LLP

[57] ABSTRACT

A polymer composition on the base of (co)polymer of ethylene for transforming an ultraviolet light into a red spectral range comprising from 0.005–1.0% by weight of a tri-component mixture additives and a compatible carrier, the rest by the weight of the total composition, said tri-component mixture comprising component A, selected from the group of oxide, organic or inorganic salt of Eu, component B, selected from the group of beta-diketones and component C, selected from the group of bidentate nitrogen heterocycles or from trialkyl substituted phosphine oxide.

16 Claims, 1 Drawing Sheet

POLYMER COMPOSITION FOR THE PRODUCTION OF FILMS USED IN AGRICULTURE

This application claims benefit of provisional Application Ser. No. 60/030,812 filed Nov. 14, 1996.

FIELD OF THE INVENTION

The present invention generally relates to a polymer films containing an additive capable of transforming UV-light or other short wavelength light into light within the red spectral range. In addition, the invention relates to the use of these polymer films in agriculture.

BACKGROUND OF THE INVENTION

The prior art illustrates various light shifting polymer compositions for use in the field of agriculture.

For example, Japanese Patent Application Nos. 06199814 and 05170969 disclose a light absorbing polymer composition containing an active additive from the group of pyrazine compounds. These patents teach that when the active additives are casted onto glass plates, the energy of the UV-light is transformed or shifted and then reflected in the blue spectral range. However, the use of such polymer compositions in agriculture is limited because blue light is not very effective in accelerating the growth and productivity of agriculture crops compared with light in the red spectral range. Russian author's certificate No. 2047624 to Minich et al. disclose a polymer composition which can be used in agriculture, containing an active additive in the form of a solid product. This product was obtained from the chemical reaction between europium nitrate, lanthanum nitrate and 1,10-phenanthroline as a solution in isopropanol.

This europium-lanthanum composition has some disadvantages; for example, the europium-lanthanum composition must be synthesized beforehand, then purified and dried. The size of the particles obtained during the synthesis are of rather large dimensions ranging size from a few microns or to tens or even hundreds of microns, which leads to an increase in light scattering by the film and consequently to the loss of light intensity because of the diffusion caused by the particles.

SUMMARY OF THE INVENTION

The present invention is directed to a novel composition for the production of films for transforming UV-light or other short wave length light into red visible light. This composition can then be used in agriculture or any other application wherein it is necessary to transform UV-light into red spectral light.

It is an object of the invention to provide an improved polymer film capable of transforming UV range light into a red, visible spectral light.

It is an other object of the present invention to provide an improved composition for production of polymer films containing polyethylene and active additives that overcome the disadvantages of heretofore available materials and provide an effective accelerator for plant growth.

The foregoing objects and other features and advantages of the present invention are achieved by preparing a polymer composition containing the following active additives:

A) oxides, selected from the group of organic or inorganic salts of europium, such as the salt of acetic acid and its homologs, the salt of fluoroacetic acid and its fluoro homologs, the salt of benzoic acid and its substituted analogs, the salts of phenyl acetic acid, picolinic acid, nicotinic acid, and quinolinic acid.

B) compounds selected from the group of beta-diketones with general formula $R^1C(O)\ CH_2\ C(O)\ R^2$ wherein:
$R^1$ and $R^2$ are independently selected from the group consisting of methyl, ethyl, propyl, butyl, pentyl, hexyl and homologs, fluorocarbons and homologs, phenyl and its homologs, or substituted analogs and 2-thienyl and analogs. For example, 4-benzoyl-3-methyl-1-phenyl-2-pyrazoline-5-one can be used as an active additive of component B.

C) compounds are independently selected from the group of nitrogen heterocycles, such as 2,2'-dipyridine or 4,4'-dipyridine or 1,10'-phenanthroline, or from the group of alkyl substituted phosphine oxides such as trioctyl phosphine oxide. The mass ratio between the active additives in the tricomponent composition is described by the algorithm as follows: one atom of the europium of the component A, three molecules of the compound B and one molecule of bidentate nitrogen heterocycle or two molecules of alkyl substituted phosphine oxide of the compound C.

The amount of an active additive which was added to the polymer composition may vary greatly but a preferable range is 0.005%–1.0% by weight of the total composition. The range of 0.01% to 0.75% was even more preferable, and the range of 0.05% to 0.5 is an especially preferred concentration.

Specific embodiment of the present invention are illustrated by the following examples. It will be understood, however, that the invention is not confined to the specific limitations, but rather to the scope of the appended claims.

BRIEF DESCRIPTION OF THE DRAWINGS

FIG. I is a graph showing optical characteristics of the film as it was obtained in Example 2, wherein:

1—is an optical density of the film;

Figure 1:
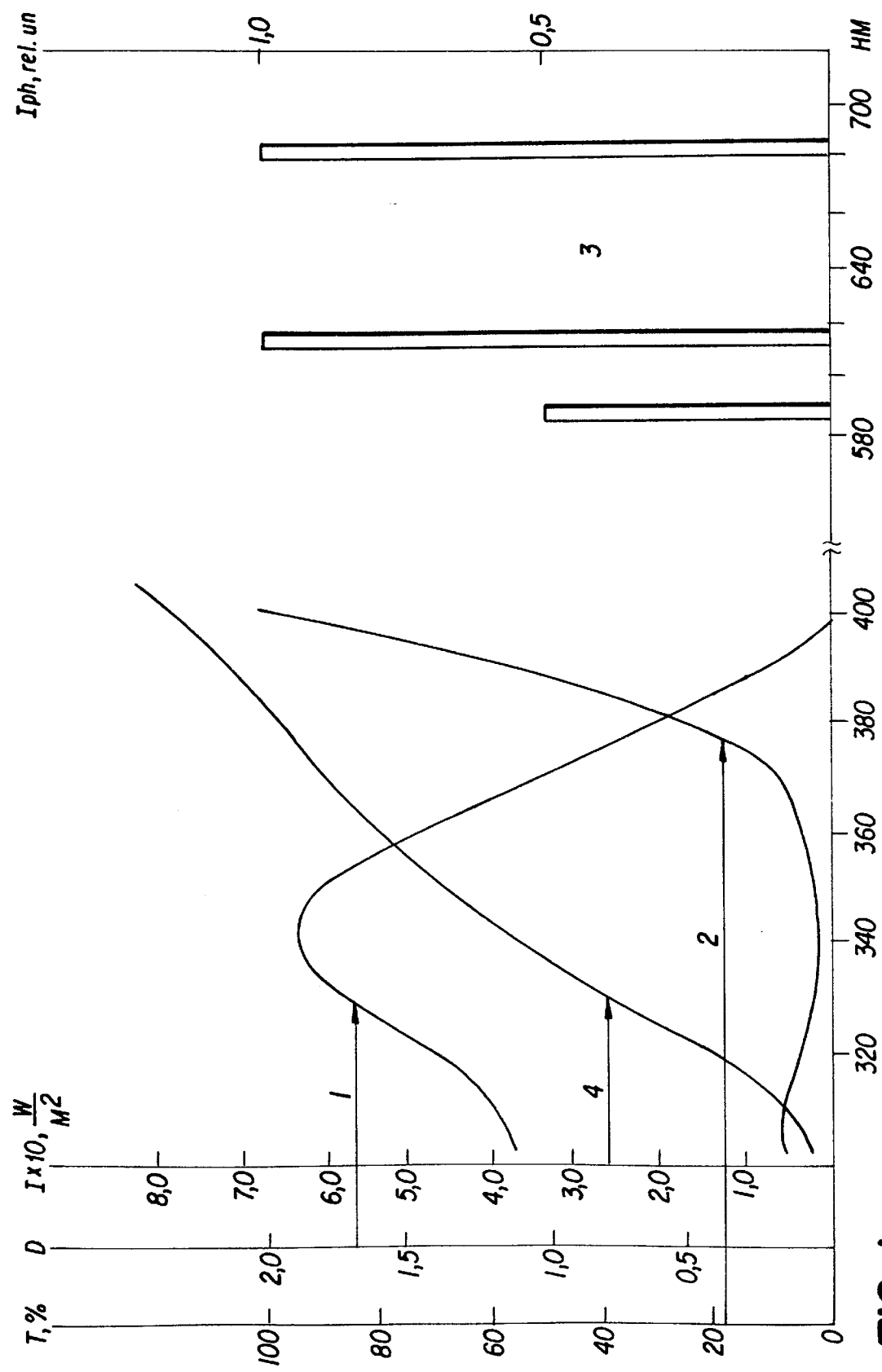

2—is a transmission (%) in the U.V. region; of the spectrum;

3—is an emission spectrum;

4—is a spectrum of the solar light in the U.V. region (Moscow Region, June).

EXAMPLE 1

An active additives mixture containing Eu oxide, thenyltrifluoroacetone and 2,2'-dipyridine in the mass ratio 1:3.78:0.88 was mechanically mixed with polyethylene (co) polymer pellets in the sum quantity about 0.3% by weight of additive to polymer and the obtained composition was extruded into a film.

EXAMPLE 2

Such active additives as thenyltrifluoroacetone and 1,10-phenanthroline in mass ratio 1:0.27 were mechanically mixed with polyethylene pellets in the sum quantity about 10% by weight of polymer. The obtained composition was extruded into pellets (concentrate 1). Hexahydrate of Eu nitrate was added to the pellets of concentrate 1 to form an active additive of the concentrate. Mass ratio between concentrate 1 with europium and initial polymer was 1:30. Mass ratio between Eu nitrate and thenyltrifluoroacetone in the obtained composition was 0.67:1. The mixture of polyethylene and concentrate with europium was then extruded into a film.

EXAMPLE 3

Eu acetate, 4-benzoyl-3-methyl-1-phenyl-2-pyrazoline-5-one and trioctylphosphine oxide in mass ratio 1:2.53:2.35 to form the europium complex was mechanically mixed with ethylene (co)polymer pellets, being in sum a europium complex concentration of 0.3% by weight of polymer. This composition was extruded into a film.

All films obtained from the described compositions do not differ by their mechanical and light scattering characteristics from those obtained from the initial polymer. They absorb 90% of U.V. component of sunlight and transform it into the radiation in the red spectral range. FIG. 1 shows the sunlight spectrum (June, middle latitude) and the absorption and emission spectra of the film obtained according to Ex. 2. Data for films obtained from compositions with other active additives do not principally differ from that shown in FIG. 1.

What is claimed is:

1. A composition for producing a polyethlene-containing film comprising:
   (a) from about 0.005 to about 1% by weight of a mixture of active components A, B and C; wherein component A is selected from the group consisting of oxides, and organic or inorganic salts of europium; component B is a beta-diketone; and component C is selected from the group consisting of bidentate nitrogen heterocycle and alkyl substituted phosphine oxides; and
   (b) polyethylene or copolymer of ethylene;
      wherein said produced films arc capable of converting UV light into the red spectral range.

2. The composition of claim 1, wherein the beta-ketone of component B has the general formula $R'(CO)CH_2C(O)R^2$, wherein $R^1$ and $R^2$ are the same or different residues selected from the group of linear or branched alkyl from $C_1$ to $C_{18}$, fluorocarbons, phenyl and 2-thienyl.

3. The composition of claim 1, wherein said active components comprise from about 0.01% to 0.75% of said composition.

4. The composition of claim 1, wherein said active components comprise from about 0.05% to 0.5% of said composition.

5. The composition of claim 1, wherein said component A europium salts are selected from the group consisting of salts of acetic acid, fluoroacetic acid, phenyl acetic acids, picolinic acid, nicotinic acid and quinolinic acid.

6. The composition of claim 1, wherein component B is 4-benzoyl-3-methyl-1-phenyl-2-pyrazoline-5-one.

7. The composition of claim 5, wherein component B is 4-benzoyl-3-methyl-1-phenyl-2-pyrazoline-5-one.

8. The composition of claim 1, wherein component C is selected from the group consisting of nitrogen heterocycles and alkyl substituted phosphine oxide.

9. The composition of claim 6, wherein component C is selected from the group consisting of nitrogen heterocycle and alkyl substituted phosphine oxide.

10. The composition of claim 8, whereon nitrogen heterocycles are taken from the group consisting of 2,2'-dipyridine and 4,4'-dipyridine and 1.10-phenantroline.

11. The composition of claim 8, wherein said alkyl substituted phosphine oxide is trioctyl phosphine oxide.

12. The composition of claim 1, Wherein the mass ratio of component B to component C is 3:1, where component C is a bidentate nitrogen heterocycle.

13. The composition of claim 1, wherein the mass ratio of component A to component C is 1:2, where component C is an alkyl substituted phosphine oxide.

14. A method of producing a polymer film, comprising the steps of:
   (a) mixing the composition of claim 1; and
   (b) forming a film which absorbs 90% of the UV component of sunlight and transforms it into radiation in the red spectral range.

15. The method of claim 13, wherein said film is formed by extrusion.

16. A polymeric film produced by the method of claim 14.

* * * * *